Aug. 12, 1952 H. A. AFFEL, JR 2,607,009
ELECTROMAGNETIC WAVE TRANSMISSIVE STRUCTURE
Filed Oct. 8, 1948 2 SHEETS—SHEET 1

INVENTOR.
HERMAN A. AFFEL, JR.
BY
AGENT

INVENTOR.
HERMAN A. AFFEL, JR.
BY
AGENT

Patented Aug. 12, 1952

2,607,009

UNITED STATES PATENT OFFICE 2,607,009

ELECTROMAGNETIC WAVE TRANSMISSIVE STRUCTURE

Herman A. Affel, Jr., Philadelphia, Pa., assignor to Philco Corporation, Philadelphia, Pa., a corporation of Pennsylvania Application October 8, 1948, Serial No. 53,427

7 Claims. (Cl. 250—33.63)

The present invention relates broadly to the provision of enclosures for microwave energy radiating apparatus. More particularly, it is concerned with providing improved enclosures for orientable antennas suitable for transmission or reception of microwave energy.

Apparatus built in accordance with the present invention is especially useful in the field of radar and, although not in any way limited to this field, it is with particular reference to radar apparatus that the preferred embodiment of the present invention is hereinafter discussed.

It has long been a serious problem, in radar transmission, to provide an enclosure for the antenna of a radar installation which can be placed so as to protect the exposed portions of such an antenna from the elements as well as to maintain a frequently desirable pressure differential between the region immediately surrounding the antenna and the medium outside that region.

Any portion of such an enclosure, through which the beam of microwave energy radiated or received by the radar antenna need not pass at any time during transmission or reception, may evidently be constructed of any material which has the required mechanical characteristics of strength, rigidity, and the like. In fact, this portion of the enclosure is often formed by the base on which the radar antenna is mounted. If the antenna is mounted in the fuselage of an airplane, for example, the outer skin of the airplane will ordinarily form this portion of the enclosure.

On the other hand, it will be evident that the principal requirement for that portion of the enclosure through which the beam must pass is that it be wave-transmissive. Such a wave-transmissive portion is often termed a "window" and the word will be used in this sense hereinafter.

The same structure cannot ordinarily be used for the window as is used for the remaining portion of the enclosure, since most of the materials and structures which possess the required mechanical characteristics have electrical characteristics which are such as to produce substantial attenuation of the beam as it passes through the enclosure or to alter its shape or direction in such a manner as to render it unusable for certain applications. Again using the airplane mounting as an example, modern planes are almost invariably of metal construction, and metal, as is well known, will pass practically no microwave energy. In the past, windows have been made of thin sheets of some plastic material which would permit the beam to pass substantially undiminished in strength. These prior art windows, however, suffered from two very serious defects.

Being constructed of relatively thin sheets of plastic, they were inherently weak and fragile. Furthermore it was impractical to add reinforcing members, even of non-metallic construction, since they, too, would cause distortion and absorption of the beam. Thus the prior art wave-transmissive window was mechanically highly unreliable, particularly when viewed in the light of the importance of the equipment it was to protect.

An even more serious shortcoming, however, was the fact that, with the prior art window, it had been impractical to increase the angle of incidence of the radar beam on the face of the window to values in excess of about 70°, even under optimum design conditions. This was due to the fact that, when this critical angle of incidence was exceeded, the direction of the beam was changed appreciably while traversing the enclosure. Any change in the direction of the antenna would then result in a different change in the direction of the beam. While it was possible to calibrate each individual antenna in relation to its window so as to take this alteration of beam direction into account, such calibration was, of course, only valid for one particular shape of the window, as well as inherently complicated and difficult to apply. To avoid the necessity of calibration, careful shaping of the window was often attempted in order to prevent the angle of incidence from exceeding the critical value. This was also inconvenient, and often impossible, either because the beam had to scan too large a sector, or because of mechanical and structural limitations on the shaping of the entire enclosure.

In an effort to avoid these undesirable features, recourse has been had, in the past, to many expensive and complicated expedients. When the antenna was located on the ground, use of a window could sometimes be avoided by rustproofing of construction members to prevent deterioration by rain and snow. This necessitated periodic reapplication of rustproofing material. The antenna could also be rendered immune to most normal wind conditions, but only by the expensive and complicated process of perforating the structure to reduce its wind resistance.

These problems became more acute when applied to shipborne radar since rustproofing is considerably less effective against the salt-laden spray of ocean water, and wind velocities are often considerably higher on water than on land.

When the problem of mounting radar antennas on airplanes is considered, a vastly more unfavorable set of circumstances must be taken into account. To begin with, the present-day airplane is almost invariably of metal construction. Since metal will, in general, not permit the passage of microwave energy, it is essential that the radar antenna be so located on board the airplane that its beam may reach, or scan, the desired area or sector without being obstructed, either partially or wholly, by the metallic structure of the plane. If the radar is to scan a large area, this implies that its antenna must be located in a relatively exposed position, so that the beam can reach each portion of the desired area without interference from the metallic structure as hereinbefore discussed. For instance, it is common practice to locate some types of radar antennas beneath the central portion, or belly, of the plane, so that their beams can scan azimuthally throughout a complete circle and thus cover a circular area whose radius is limited only by the range of the radar. In such a location the radar antenna is exposed both to the very strong wind caused by the motion of the plane relative to the surrounding air, and to changes in air pressure attendant upon the high-altitude flying of many modern planes. A housing is imperative to protect the antenna from exposure to these influences and this housing must, in addition, have satisfactory aerodynamical properties. Failure to satisfy this latter requirement may, and often does, substantially reduce the speed and maneuverability of the airplane in flight. This problem of aerodynamic properties has recently assumed even more serious proportions with the application of radar to guided missiles for self-homing and other purposes. Inasmuch as missiles of this sort frequently travel at speeds of thousands of miles per hour, even the slightest protuberance must be perfectly streamlined, if it can be tolerated at all. Otherwise the performance of the missile will become erratic.

Unfortunately the desirable aerodynamic characteristics of streamlining do not always coincide with the electrical characteristics required for successful microwave energy transmission. Thus, if reasons of aerodynamical performance forced the design of a window which was substantially flush with the surface of the airplane, the scanning of the antenna had to be limited in such a way as not to exceed the above-mentioned critical angle of incidence. To give a practical illustration, if the antenna were mounted completely within the fuselage and the window through which it radiates or receives energy were made flush with the belly of the plane, it could not be tilted more than 70° from the vertical in any direction, even if all limitations due to obstruction by the metal structure of the plane had been eliminated.

On the other hand, even if the scanning angle of the antenna was very limited, the aerodynamic requirements of the enclosures were frequently such as to cause the angle of incidence to exceed the critical value. This would be the case if the antenna were mounted in the sharp, pointed nose of a guided missile and were radiating microwave energy in the direction of flight of the missile.

It is, accordingly, a primary object of the present invention to provide a microwave antenna system capable of radiating a beam of microwave energy in any desired direction, regardless of the physical configuration of the enclosure surrounding the system.

It is another object of the present invention, to provide a window for a microwave antenna, having electrical characteristics which are independent of its aerodynamic characteristics.

It is a further object of the present invention to provide a weatherproof enclosure for a radar antenna which has electrical characteristics substantially independent of its external physical configuration.

It is still another object of the present invention to provide a window for a microwave antenna which is of strong and rigid construction and well able to withstand ordinary service conditions, while permitting undeflected passage of a beam of microwave energy.

These and other objects of the present invention will become apparent from the following considerations.

I have discovered that it is possible to construct a wave-transmissive window which will perform the functions hereinbefore indicated without changing the direction of a beam of microwave energy as it passes through the window. I have found that to maintain the direction of such a beam constant while passing through the window, the phase velocity of the waves of which the beam is composed must remain the same as the phase velocity of those same waves in the medium on either side of the window; and I have further discovered that this phase velocity can be held constant as hereinbefore described by constructing the window of suitably spaced metallic plates, the spaces between these plates being filled with a suitable dielectric material.

The structure and operation of apparatus embodying the principles of the present invention will be more clearly understood from a consideration of the following description and appended drawings in which.

Figure 1:
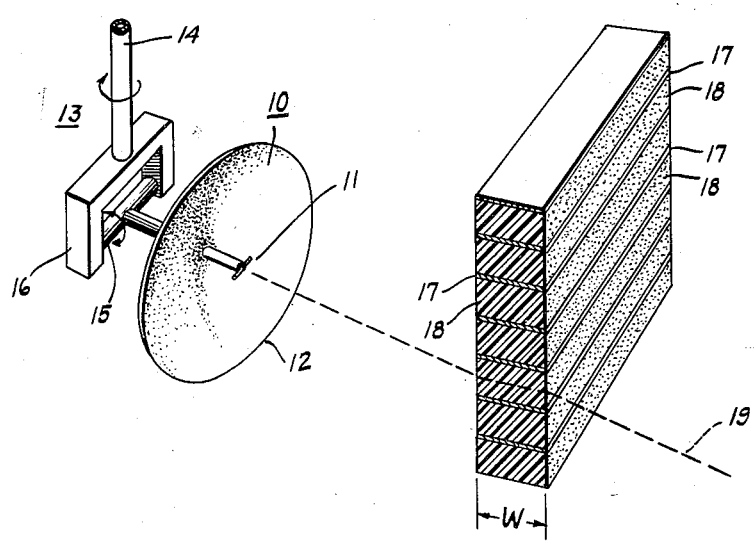
Figure 1 is a somewhat diagrammatic representation of a radar antenna system embodying the present invention.

Referring now more particularly to Figure 1, there is shown a conventional radar antenna 10, comprising a dipole 11 and a reflector 12, mounted on a supporting structure 13, comprising shafts 14 and 15, and yoke 16. The shafts and yoke may be made hollow so as to function as waveguides for transferring energy to and from dipole element 11. Suitable motors and cam arrangements (not shown) are provided to impart a rotational motion to shaft 14 about its axis and an oscillatory motion to shaft 15 about its axis, causing the antenna 10 to rotate and nod.

By making the rotation of shaft 14 much more rapid than the oscillation of shaft 15, a scanning motion is imparted to the antenna and thereby to the antenna pattern, producing what is commonly termed a spiral scan. As is usual in radar apparatus such an antenna may be used both for transmission and for reception.

Disposed in front of the antenna is a portion of a wave transmissive window constructed in accordance with the present invention. It will be understood that, in most practical applications, this window would cover that portion of the area of the enclosure which must be capable of transmitting the radiated beam, and would be joined, at the edges, to the remaining, non-transmissive portion of the enclosure to form a substantially continuous closure. For the sake of simplicity of illustration, however, only a portion of such a window is shown, which is sufficient to enable complete explanation of the operation of the device.

The window comprises essentially a plurality of parallel metal plates 17, spaced at intervals which are preferably equal. The spaces between the plates are filled with nonconductive material having a dielectric constant which is selected in relation to the spacing of the plates in a manner which is hereinafter set forth. While it is preferable to use a solid dielectric material for this purpose, it is also possible that the major portion of the filling between the plates shall consist of a liquid or gaseous dielectric confined within suitable boundaries formed of solid dielectric sheets. In the absence of plates 17, passage of electromagnetic waves through the dielectric material 18 would produce a decrease in their phase velocity from that which existed in the surrounding air prior to the entry of the waves into the dielectric medium. The extent of this decrease will depend on the ratio between the dielectric constant of the material 18 and that of the surrounding medium which, in general, will be air. In the absence of the dielectric material 18, on the other had, plates 17 would increase the phase velocity of the waves in the beam passing between plates 17, provided, of course, that these waves were polarized in a plane parallel to that of the plates. The magnitude of this increase in phase velocity is a function of the wave length of the waves and the separation of the plates. By properly dimensioning the spacing of the plates and by choosing a filling material having a suitable dielectric constant, the two components can be combined as hereinbefore described, so that their opposing effects will cancel out, leaving the phase velocity of the beam unchanged by passage through the structure. Then a beam incident upon the parallel plate structure at almost any angle will be transmitted through the structure with no change in he direction of propagation, but with a slight parallel displacement due to the width W of disclosure of Figure 1.

This condition is illustrated, for one element of a beam originating at reflector 12, by broken line 19 which emerges from the enclosure traveling in a direction parallel to the direction in which it was traveling when it entered the enclosure. Since, in general, the width W of the enclosure will be negligible compared with the distance between antenna and target, the resultant parallel displacement of the beam will also be negligible so far as the accuracy of orientation of the beam is concerned. It will be appreciated, therefore, that the width of the plates is not critical, but may be selected principally with a view to the mechanical requirements of the system.

The only real limitation on the angle of incidence of the beam upon the face of the window is that this angle must be small enough to permit penetration of a portion of the beam between at least one pair of parallel plates. Since the phase velocity of the waves is unchanged during passage through the window, the shape of the inner and outer boundary surfaces of the window will evidently have no effect on the direction of the beam, but only on the parallel displacement due to the width of the window which has already been shown to be negligible. Thus the window constructed in accordance with the present invention is capable of assuming almost any mechanically desirable shape without impairing its wave-transmissive properties. Since even this parallel displacement will disappear if the metal plates are arranged in planes parallel to the beam, it is preferred that this latter condition be fulfilled in a stationary beam or in at least one of the possible orientations of an orientable beam.

The preferred procedure to be followed in constructing a window in accordance with the present invention involves first the selection of a dielectric material having suitable physical characteristics such as strength, weather resistance and ease of manufacture. Then, knowing the wavelength at which the antenna system is to be operated, the spacing of the plates necessary to eliminate completely any change in phase velocity owing to the presence of the dielectric material may readily be determined by use of the following formula:

$$a = \frac{\lambda_0}{2(1-1/K_e)^{1/2}}$$

where $a$ represents the separation of the plates, $\lambda_0$ the wavelength of the beam in free space, and $K_e$ the dielectric constant of the material between the plates. While this formula refers to conditions in free space, it is, for all practical purposes, sufficiently accurate for application when the surrounding medium is air. It will be understood that a consistent system of units must be used in obtaining solutions to the above equation. A preferred embodiment uses, for a dielectric material, polystyrene having a dielectric constant of 2.52. For operation with a 3.2 cm. radar set, this yields a required plate spacing of 2.06 cm. for undeflected transmission. Numerous other dielectrics are equally suitable for application in this connection. Some of these are polyethylene, some types of glass and steatites.

While the instructions set forth in the preceding paragraph relate to the construction of a system in which the effect of the dielectric material on the phase velocity of waves traversing such material is substantially completely eliminated by appropriate spacing of the metal plates, it will be understood that the invention is not limited to such ideal embodiments but contemplates also arrangements wherein the spacing of the plates is made such as to reduce substantially the effect of the dielectric material on the phase velocity, although not completely eliminating it.

Figure 2:
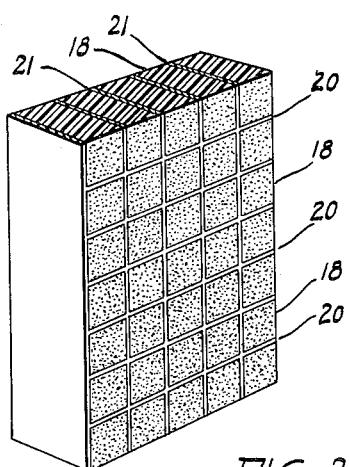
Figure 2 illustrates a modification of the window shown in Figure 1.

As has been intimated in the foregoing discussion, a window constructed in the manner set forth is suitable for use only if the waves to be transmitted through it are polarized in a plane substantially parallel to the plates themselves. This is because of the fact that the parallel plates are capable of affecting the phase velocity only of waves which are so polarized. With an orientable antenna it may be unfeasible to maintain the polarization always parallel to a fixed set of parallel plates, and accordingly it may be useful to provide an embodiment whose affect is substantially independent of the polarization of the waves. Such an embodiment will now be described with reference to Fig. 2.

Here the window is constructed using two separate sets of parallel plates 20 and 21 respectively, the plates of one set being disposed substantially perpendicularly with respect to the plates of the other set. The spaces between the plates are again filled with a suitable dielectric material and the spacings of the plates in each set are determined in accordance with the principles hereinbefore set forth. It is well known that a wave polarized in any predetermined plane may be considered as being composed of two mutually perpendicular components. Thus, by disposing two sets of plates at right angles to each other, each set will be parallel to the plane of polarization of one of these components and will therefore act on that component in the desired manner. The dielectric filler not having any directional properties, will also affect each component individually as desired, and the cooperation between each set of plates and the dielectric material included between them will result in an undeviated transmission of each component, and therefore also in the desired undeviated transmission of the resultant wave.

As hereinbefore mentioned, where an antenna is to be installed in an airplane it may be desirable to vary the configuration of the window to satisfy certain aerodynamical requirements. Accordingly there will be described certain representative embodiment of the invention particularly adapted for use in aircraft and high speed projectiles.

Figure 3A:
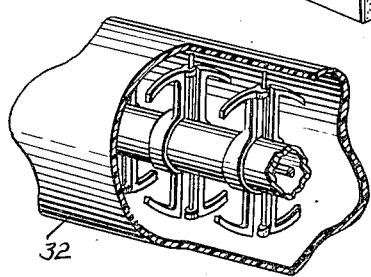
Figure 3a is a detailed and enlarged view of a portion of the embodiment illustrated in Figure 3.
Figure 3:
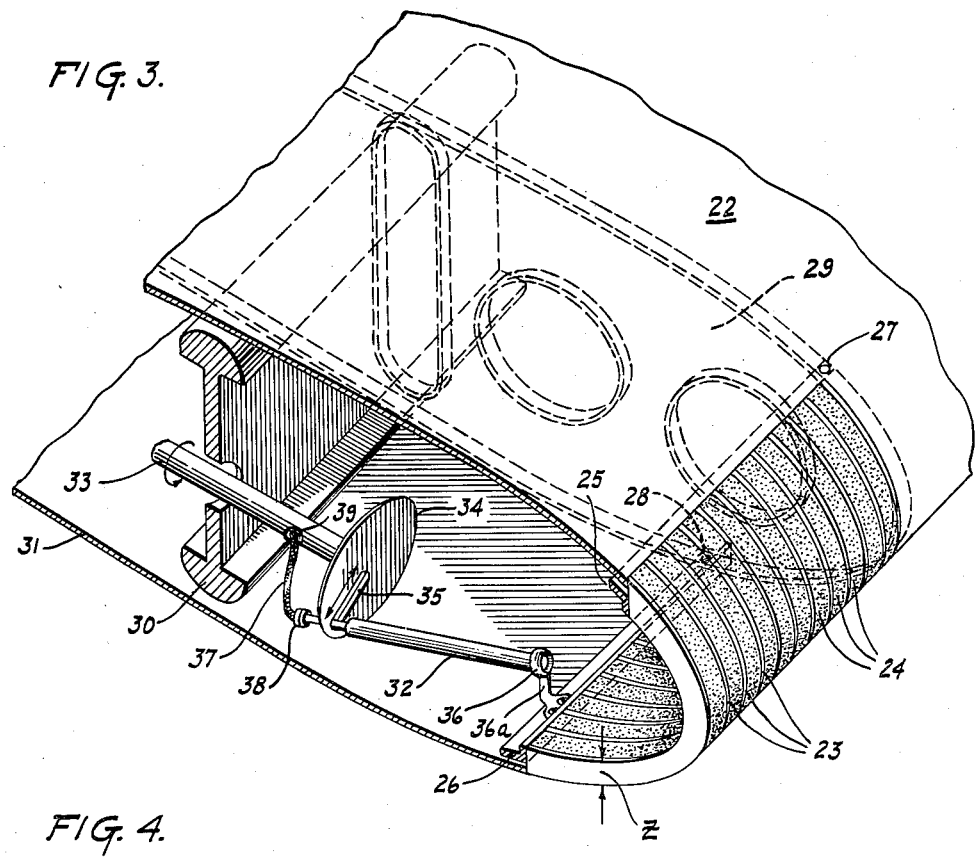
Figure 3 is a sectional perspective view illustrating the embodiment of the invention in a radar antenna installation in the wing of a conventional aircraft.

Referring to Fig. 3, there is illustrated an embodiment of the invention in an antenna installation in the wing of a conventional airplane. A portion of the wing 22 is shown in sectional perspective to permit clear presentation of the features of the invention. Here the parallel plate structure may take the trough-like form represented by curved metal plates 23, whose outer edges are shaped to conform to the leading edge of the wing, and the spaces between plates are again filled with a dielectric material 24 having suitable mechanical characteristics.

Ordinarily this structure may be confined between two adjacent ribs, where it is mounted in the following manner. Two metal beams 25 and 26 of L-shaped cross-section are welded to the ends of metal plates 23 in such a manner that one beam connects those ends which lie along one longitudinal edge of the trough-like structure, while the other beam connects those ends which lie along the other longitudinal edge of the structure. Each end of each of beams 25 and 26 is then riveted, or otherwise affixed to the flanges of the ribs at which the structure terminates. This condition is illustrated for one end of the structure by riveted joints 27 and 28 which join beams 25 and 26 respectively to rib 29. The other end of each beam is similarly terminated on a rib which, for clearness of illustration of other details, has been omitted. If adjacent ribs should be spaced so closely together that the length of the window exceeds their spacing, intervening ribs can be terminated at the spar 30 and any additional bracing of the leading section of the wing necessitated by the omission of the front end of the rib may be provided by braces extending between the adjacent complete ribs. It will be understood, that the outer skin 31 which is ordinarily fastened to the flanges of the ribs is omitted from the section occupied by the window, the metal plates of the latter lending strength to that section at least equal to any which the skin would otherwise provide. In fact, the width Z of the plates and the qualities of the dielectric are determined only by the mechanical strength required in this section of wing. Because of the space limitations imposed by the shape, and particularly the thinness of the wing, the antenna 32—which is shown here contained in its housing—is preferably of the well-known end-fire type and is mounted so as to be movable to produce a spiral scan. An enlarged view of a section of this antenna, with its housing partly cut away to reveal its internal construction, as illustrated in Figure 3a. It will be seen that the antenna comprises essentially a number of individual component antennas, each including a small curved dipole, which are spaced longitudinally along a common coaxial line from which they are fed in suitable phase relation. The antenna is characterized in that it produces a beam which is highly directional in the direction of its longitudinal axis. Since the component antennas illustrated are of relatively small dimensions in the direction transverse to the longitudinal axis of the antenna, it is possible to obtain a directional beam from an antenna having a relatively small cross-section in a plane perpendicular to the direction of the beam. Because antennas using reflectors to collimate radiated waves into a directional beam are necessarily relatively bulky, the end-fire antenna finds application where space is limited, as in the present example. Since many types of such end-fire antennas are well-known in the art, the invention is not to be construed as limited to the use of the specific form shown. The antenna mounting may comprise a shaft 33 on which is rigidly mounted a circular plate 34. A radial slot 35 is provided in plate 34 and one end of antenna 32 rests in this slot so as to be free for reciprocatory motion therein. The entire antenna 32 is free to swing about the pivot end 36 of support 36a subject to the restrictions imposed by plate 34. Motors and cam arrangements may be provided to impart a rotational motion to shaft 33 and plate 34 about their common axis, and a radially reciprocating motion to the end of antenna 32 within slot 35. As in the case of the other illustrated embodiments of the invention, these adjuncts are not shown because they are well known, because they do not form any part of the invention claimed, and because to show them would needlessly complicate the drawings.

Energy is transferred to and from antenna 32 by means of a flexible coaxial transmission line 37 which may be coupled to the antenna proper at that end of the antenna which rests in slot 35 by means of a conventional rotating joint 38. Up to a point in the vicinity of the antenna, coaxial line 37 may be contained within shaft 33 which is of hollow construction for that purpose. The coaxial line then leaves shaft 33 through a hole 39 in the side of the shaft to connect to antenna 32 as hereinbefore described. It will be understood that the exposed portion of line 37 has to be sufficiently long to allow full radial displacement of the antenna end in slot 35.

With the structure of the present invention, the antenna 32 of Figure 3 can evidently be permitted to scan through much wider angles than would be possible if the direction of the beam were limited by a critical angle of incidence upon the antenna enclosure.

Figure 4:
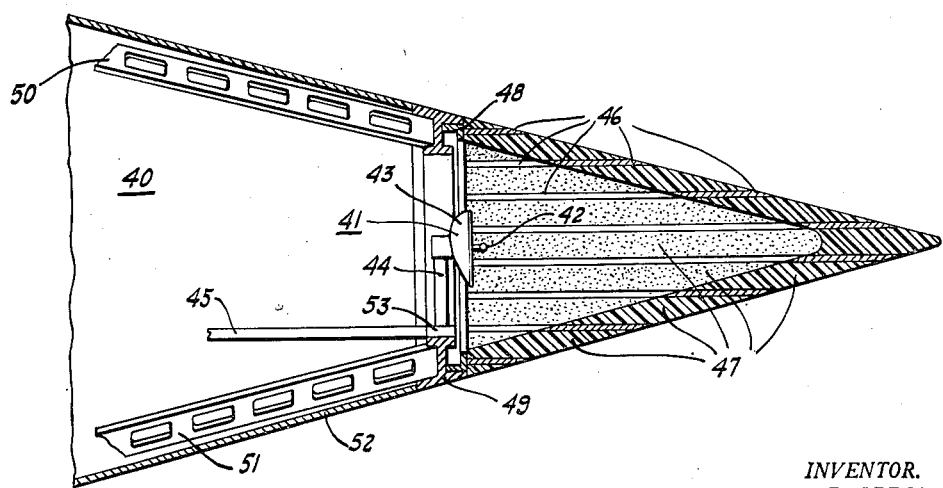
Figure 4 is a sectional elevational view illustrating the embodiment of the invention in a radar antenna installation in the nose of a guided missile.

Referring now to Fig. 4, there is illustrated a portion 40 of the nose of a guided missile, which is sharply pointed and whose exterior surface may be in the form of a surface of revolution whose cross-section is illustrated. Within the nose of the missile is located a radar antenna system 41 which may be adapted for use in guiding the missile to its target. For such an application a conventional cosecant-squared, fan-beam antenna pattern may be employed, which may be provided by means of a dipole 42 and a reflector 43 which is suitably shaped for the purpose. With this type of beam, only azimuthal scanning is required, and that only through a very small angle. Accordingly, antenna 41 may be mounted on shaft 44 which is provided with cams and motors (not shown) adapted to produce a small oscillatory motion of shaft 44 about its vertical axis. As in the embodiment of Fig. 1, the shaft may be hollow and may therefore serve as a waveguide for transferring energy to and from the antenna, another waveguide 45 serving to connect the hollow shaft and the remainder of the radar system (not shown). The walls of the nose are again constructed in accordance with the invention over the area which must permit undisturbed passage of microwave energy to and from the antenna. This structure comprises suitably spaced, horizontally disposed, parallel metal plates 46. Each plate is differently shaped to conform to the shape of the outer surface of the nose of the missile and the intervals between the plates are filled with a suitable dielectric material 47. Because of the unusually high speeds at which guided missiles travel, a substantial rise in temperature of their walls, including the window, may be expected. Hence it is well to select a dielectric material which is mechanically stable at high temperatures—for example a steatite, as hereinbefore mentioned.

The ends of each of metal plates 46 are welded to an annular metal ring 48 of L-shaped cross-section which latter is in turn riveted, or otherwise affixed to the adjacent flange of another annular metal supporting ring 49, this latter being of I-shaped cross-section and being used as a termination for the longitudinal struts 50 and 51 to which the outer covering 52 of the missile is affixed. A bearing 53 is mounted on the inner rim of ring 49, shaft 44 being arranged to rotate within this bearing.

It will be apparent that if it were attempted to use a window of the conventional form in the present instance, the critical angle of incidence of such a window would be exceeded even for relatively small scanning angles, owing to the unusual shape of the missile nose. This difficulty is overcome by utilizing the structure as illustrated, so that a scanning angle of almost any desired magnitude may be used.

Thus it will be seen that the invention makes possible the construction of enclosures or windows of almost any desired shape or physical configuration which are adapted for use with antennas without undesirably modifying their electrical characteristics. It will be apparent that there may be circumstances other than those hereinbefore set forth which will make it desirable to utilize an embodiment of the invention, and such applications are regarded as being within the scope of the present invention.

I claim:

1. In combination, an orientable directional antenna and an electromagnetic-wave-transmissive window at least partially surrounding said antenna and adapted to cooperate therewith without substantially affecting the electrical characteristics of said antenna, said window comprising at least a plurality of substantially parallel, spaced, electrically-conductive plates, the spaces between said plates being substantially filled with non-conductive material having a dielectric constant substantially different from that of a medium in which said combination is to be employed, the spacing of said plates being substantially in accordance with the expression:

$$a = \frac{\lambda_0}{2\left(1-\frac{1}{K_e}\right)^{\frac{1}{2}}}$$

where $a$ is the spacing between adjacent plates, $\lambda_0$ is the wavelength in free space of electromagnetic waves of at least a predetermined frequency traversing said window, and $K_e$ is the dielectric constant of said filling material, the said spacing of said plates being such as substantially to nullify the tendency of said filling material to alter the phase velocities of said electromagnetic waves.

2. A combination according to claim 1, in which said plates are substantially parallel to the direction of orientation of said antenna when said antenna is directed at a predetermined portion of said window.

3. An electromagnetic wave transmissive structure comprising a plurality of substantially parallel, spaced, electrically conductive plates, the spaces between said plates being substantially filled with electrically non-conductive material having a dielectric constant substantially differing from that of air and the spacing of said plates being substantially in accordance with the expression:

$$a = \frac{\lambda_0}{2(1-1/K_e)^{\frac{1}{2}}}$$

where $a$ is the spacing between adjacent plates, $\lambda_0$ is the wavelength in free space of electromagnetic waves for which the tendency of said structure to alter the direction of said waves traversing said structure is substantially a minimum, and $K_e$ is the dielectric constant of said filling material.

4. An electromagnetic wave transmissive structure comprising a plurality of substantially parallel slabs of dielectric material, adjacent slabs being separated by relatively thin layers of conducting material and the spacing of said layers being substantially in accordance with the expression:

$$a = \frac{\lambda_0}{2(1-1/K_e)^{\frac{1}{2}}}$$

where $a$ is the spacing between adjacent layers, $\lambda_0$ is the wavelength in free space of electromagnetic waves, for which the tendency of said structure to alter the direction of said waves traversing said structure is substantially a minimum, and $K_e$ is the dielectric constant of the material of said slabs.

5. A combination according to claim 1, in which the edges of said plates farthest from said antenna are shaped so as to define a surface having predetermined aerodynamical characteristics, and in which the boundaries of said filling material farthest from said antenna are shaped to conform to said surface.

6. A combination according to claim 1 in which said antenna constitutes a source of electromagnetic wave energy polarized in a plane substantially parallel to said plates.

7. In combination, an orientable directional antenna and an electromagnetic-wave-transmissive window at least partially surrounding said antenna and adapted to cooperate therewith without substantially affecting the electrical characteristics of said antenna, said window comprising at least two sets of electrically-conductive plates, the plates of each set being arranged in substantially parallel spaced relationship, the plates of one set being disposed in substantial perpendicularity with respect to the plates of the other set, the spaces between said plates being substantially filled with non-conductive material having a dielectric constant substantially differing from that of a medium in which said combination is to be employed, the spacing of each set of said plates being substantially in accordance with the expression:

$$a = \frac{\lambda_0}{2\left(1 - \frac{1}{K_e}\right)^{1/2}}$$

where $a$ is the spacing between adjacent plates of each said set, $\lambda_0$ is the wavelength in free space of electromagnetic waves of at least a predetermined frequency traversing said window, and $K_e$ is the dielectric constant of said filling material, the said spacing of the plates of each said set being such as substantially to nullify the tendency of said filling material to alter the phase velocities of said electromagnetic waves.

HERMAN A. AFFEL, JR.

REFERENCES CITED

The following references are of record in the file of this patent:

UNITED STATES PATENTS

| Number | Name | Date |
|---|---|---|
| 2,206,683 | Wolff | July 2, 1940 |
| 2,442,951 | Iams | June 8, 1948 |
| 2,461,005 | Southworth | Feb. 8, 1949 |
| 2,508,479 | Wheeler | May 23, 1950 |

OTHER REFERENCES

Bell Telephone System Technical Publication No. B, 1423, "Metal Lens Antenna" by W. E. Kock, November 1946.

Bell Telephone System Technical Publication, No. B, 1519, "Metallic Delay Lenses" by W. E. Kock, January 1948.